(12) United States Patent
Schönfeld et al.

(10) Patent No.: US 7,538,069 B2
(45) Date of Patent: May 26, 2009

(54) SPHERICAL ACTIVE CARBON

(75) Inventors: Manfred Schönfeld, Velten (DE); Raik Schönfeld, Velten (DE)

(73) Assignee: Blucher GmbH, Erkrath (DE)

( * ) Notice: Subject to any disclaimer, the term of this patent is extended or adjusted under 35 U.S.C. 154(b) by 510 days.

(21) Appl. No.: 10/535,954

(22) PCT Filed: Nov. 20, 2003

(86) PCT No.: PCT/DE03/03866

§ 371 (c)(1), (2), (4) Date: Jan. 23, 2006

(87) PCT Pub. No.: WO2004/046033

PCT Pub. Date: Jun. 3, 2004

(65) Prior Publication Data

US 2006/0148645 A1 Jul. 6, 2006

(30) Foreign Application Priority Data

Nov. 20, 2002 (DE) .............................. 102 54 241

(51) Int. Cl.
*C01B 31/08* (2006.01)
(52) U.S. Cl. ........................ 502/416; 502/8; 423/445 R
(58) Field of Classification Search ................ 502/416, 502/8; 423/445 R
See application file for complete search history.

(56) References Cited

U.S. PATENT DOCUMENTS

| 4,261,709 A | * | 4/1981 | Itoga et al. ..................... 95/141 |
| 5,094,754 A |   | 3/1992 | Maroldo et al. ............. 210/635 |
| 6,300,466 B1 |  | 10/2001 | Heschel et al. .............. 528/481 |

FOREIGN PATENT DOCUMENTS

| EP | 0 326 271 B1 | 8/1989 |
| WO | WO 96/21616 | 7/1996 |
| WO | WO 99/28234 | 6/1999 |

OTHER PUBLICATIONS

Murrell et al., Narrow Pore Distribution Formed in Steam and CO2 Gasified Cokes of different Origin in Carbon vol. 26 No. 1 pp. 33-39 1988 no month.*

Jun'Ichi Hayashi, et al., "Fractal Dimensions of Activated Carbons Prepared From Lignin by Chemical Activation", *Letters to the Editor/ Carbon*, 40 (2002), pp. 617-636. no month pp. 630-632 only.

* cited by examiner

*Primary Examiner*—Stuart Hendrickson
(74) *Attorney, Agent, or Firm*—Mayer & Williams PC; Keum J. Park, Esq.

(57) ABSTRACT

The invention relates to spherical active carbon having the following pore size distribution: a) 1.2 1.7 nm: 20-50%, b) 1.7 2.1 nm: 20-50%, c) 2.1 2.5 nm: 10-25%, d) 2.5 2.9 nm: 3-15%, e) 2.9 3.3 nm: 1-10%. The sum of a) to e) is at least 88%. The difference between the sum of a) to e) in relation to 100% corresponds to a proportion of pores having a diameter of <1,2 nm and/or >3,3 nm. The fractal dimension of the open porosity is at least 2.30.

13 Claims, 2 Drawing Sheets

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| P/P$_0$ | V$_{gas}$ stp cm$^3$g$^{-1}$ | r$_k$ Å | t Å | r$_p$ Å | r$_k$ Å | r$_p$ Å | Δt Å | ΔV$_{gas}$ stp cm$^3$g$^{-1}$ | ΔV$_{liq}$ ×10$^3$ cm$^3$g$^{-1}$ | ΔtΣs ×10$^3$ cm$^3$g$^{-1}$ | V$_p$ ×10$^3$ cm$^3$g$^{-1}$ | S m$^2$ | ΣS m$^2$ |
| 0.99 | 161.7 | 950 | 25.0 | 978 | 711 | 737 | 5.8 | 0.2 | 0.31 | 0 | 0.33 | 0.01 | 0.01 |
| 0.98 | 161.5 | 473 | 22.2 | 495 | 394 | 414 | 2.8 | 0.5 | 0.77 | 0.00 | 0.85 | 0.04 | 0.05 |
| 0.97 | 161.0 | 314 | 19.4 | 333 | 250 | 268 | 3.1 | 0.8 | 1.23 | 0.02 | 1.40 | 0.10 | 0.15 |
| 0.95 | 160.2 | 186 | 16.3 | 202 | 138 | 153 | 3.5 | 1.4 | 2.16 | 0.05 | 2.59 | 0.34 | 0.49 |
| 0.90 | 158.8 | 90.7 | 12.8 | 104 | 74.8 | 87.0 | 1.7 | 1.6 | 2.46 | 0.08 | 3.22 | 0.74 | 1.23 |
| 0.85 | 157.2 | 58.8 | 11.1 | 69.9 | 50.8 | 61.4 | 1.1 | 2.0 | 3.08 | 0.14 | 4.30 | 1.40 | 2.63 |
| 0.80 | 155.2 | 42.8 | 10.0 | 52.8 | 39.7 | 49.5 | 0.5 | 2.3 | 3.54 | 0.13 | 5.30 | 2.14 | 4.77 |
| 0.77 | 152.9 | 36.6 | 9.5 | 46.1 | 34.9 | 44.3 | 0.3 | 4.0 | 6.16 | 0.14 | 9.70 | 4.38 | 9.15 |
| 0.75 | 148.9 | 33.2 | 9.2 | 42.4 | 31.8 | 40.9 | 0.3 | 3.8 | 5.85 | 0.27 | 9.22 | 4.51 | 13.66 |
| 0.73 | 145.1 | 30.4 | 8.9 | 39.3 | 29.2 | 38.0 | 0.2 | 4.2 | 6.47 | 0.27 | 10.49 | 5.52 | 19.18 |
| 0.71 | 140.9 | 27.9 | 8.7 | 36.6 | 26.9 | 35.4 | 0.3 | 5.0 | 7.70 | 0.58 | 12.34 | 6.97 | 26.15 |
| 0.69 | 135.9 | 25.8 | 8.4 | 34.2 | 24.9 | 33.2 | 0.2 | 5.9 | 9.09 | 0.52 | 15.23 | 9.17 | 35.32 |
| 0.67 | 130.0 | 23.9 | 8.2 | 32.1 | 23.1 | 31.2 | 0.2 | 6.1 | 9.39 | 0.71 | 15.84 | 10.15 | 45.47 |
| 0.65 | 123.9 | 22.2 | 8.0 | 30.2 | 21.5 | 29.4 | 0.2 | 6.6 | 10.16 | 0.91 | 17.30 | 11.77 | 57.24 |
| 0.63 | 117.3 | 20.7 | 7.8 | 28.5 | 20.0 | 27.8 | 0.1 | 7.2 | 11.09 | 0.57 | 20.32 | 14.62 | 71.86 |
| 0.61 | 110.1 | 19.3 | 7.7 | 27.0 | 18.7 | 26.3 | 0.2 | 7.5 | 11.55 | 1.44 | 20.00 | 15.21 | 87.07 |
| 0.59 | 102.6 | 18.1 | 7.5 | 25.6 | 17.6 | 25.0 | 0.2 | 7.6 | 11.70 | 1.74 | 20.09 | 16.07 | 103.1 |
| 0.57 | 95.0 | 17.0 | 7.3 | 24.3 | 16.5 | 23.8 | 0.1 | 8.1 | 12.47 | 1.03 | 23.80 | 20.00 | 123.1 |
| 0.55 | 86.9 | 16.0 | 7.2 | 23.2 | 15.6 | 22.7 | 0.2 | 8.1 | 12.47 | 2.46 | 21.19 | 18.67 | 141.8 |
| 0.53 | 78.8 | 15.1 | 7.0 | 22.1 | 14.7 | 21.6 | 0.1 | 7.3 | 11.24 | 1.42 | 21.21 | 19.64 | 161.4 |
| 0.51 | 71.5 | 14.2 | 6.9 | 21.1 | 13.8 | 20.7 | 0.1 | 6.1 | 9.39 | 1.61 | 17.50 | 16.90 | 178.3 |
| 0.49 | 65.4 | 13.4 | 6.8 | 20.2 | 12.7 | 19.4 | 0.3 | 8.1 | 12.47 | 5.35 | 16.62 | 17.13 | 195.4 |
| 0.45 | 57.3 | 12.0 | 6.5 | 18.5 | 11.2 | 17.6 | 0.3 | 5.6 | 8.62 | 5.86 | 6.81 | 7.74 | 203.1 |
| 0.40 | 51.7 | 10.4 | 6.2 | 16.6 | 9.8 | 15.9 | 0.2 | 4.3 | 6.62 | 4.06 | 6.73 | 8.47 | 212.1 |
| 0.35 | 47.4 | 9.1 | 6.0 | 15.1 | | | | | | | | | | t: ΣV$_p$ = 0.28cm$^3$g$^{-1}$; t: ΣS = 212.1m$^2$g$^{-1}$

FIG. 2

SPHERICAL ACTIVE CARBON

FIELD OF THE INVENTION

The invention relates to a spherical active carbon with improved properties. Spherical active carbons in the meaning of the invention are active carbon particles with essentially similar extensions in all three spatial dimensions. Besides the spherical shape, cubical, parallelepiped or cylindrical shapes are imaginable, provided that the extensions in two different spatial dimensions do not differ by more than a factor 3, preferably less than a factor 2.

BACKGROUND OF THE INVENTION AND PRIOR ART

Besides applications, wherein classical active carbons are used as a mass product, applications requiring special high-performance active carbons are becoming increasingly important. These are applications, wherein the required amounts of active carbon for a certain purpose and a certain time of use have to be kept low, and nevertheless excellent adsorption properties (adsorption kinetics, capacity) are required. These are in particular mobile applications, such as for filters in vehicles (cars, aircrafts, etc.) or in gas masks, but also in building air filters. Besides a favorable capacity/weight ratio, other requirements play a role, such as a low pressure loss over a filter containing the active carbon. This also means, however, that it is not always possible as an additional requirement to use active carbons maximized with regard to the BET surface; rather, it may be necessary to use active carbons, which have nevertheless outstanding adsorption properties, in spite of a moderate BET surface. In any case, excellent adsorption properties are required, in particular in the case of filters, which are intended to protect persons from toxic gases.

From the document EP 0 326 271, an active carbon is known in the art, which can be prepared from a polysulfonated copolymer. It has a multimodal pore size distribution, i.e. a high share of mesopores and macropores.

From the document WO 96/21616, an active carbon prepared from monosulfonated copolymers is known in the art. This active carbon, too, has a relatively high share of mesopores and macropores.

From the document WO 99/28234, a method for preparing an active carbon from styrene-divinylbenzene copolymers is known in the art, and by variation of parameters of the method, the pore size distribution can be adjusted for a wide range. The active carbons specifically prepared according to this document have, however, a share of pores>3 nm of more than 13 % v/v of the total open porosity.

All above prior art active carbons have the common drawback that the adsorption capacity is not yet sufficient for all requirements, which are imposed on high-performance adsorbents, in particular in the mobile field.

SUMMARY OF THE INVENTION

It is the technical object of the invention to provide an active carbon, which meets all requirements of a high-performance adsorbent.

BRIEF DESCRIPTION OF THE DRAWINGS

FIG. 2 is a table showing adsorption and desorption isotherm data used to calculate the pore size distribution of FIG. 1.

DETAILED DESCRIPTION OF THE PREFERRED EMBODIMENTS

Figure 1:
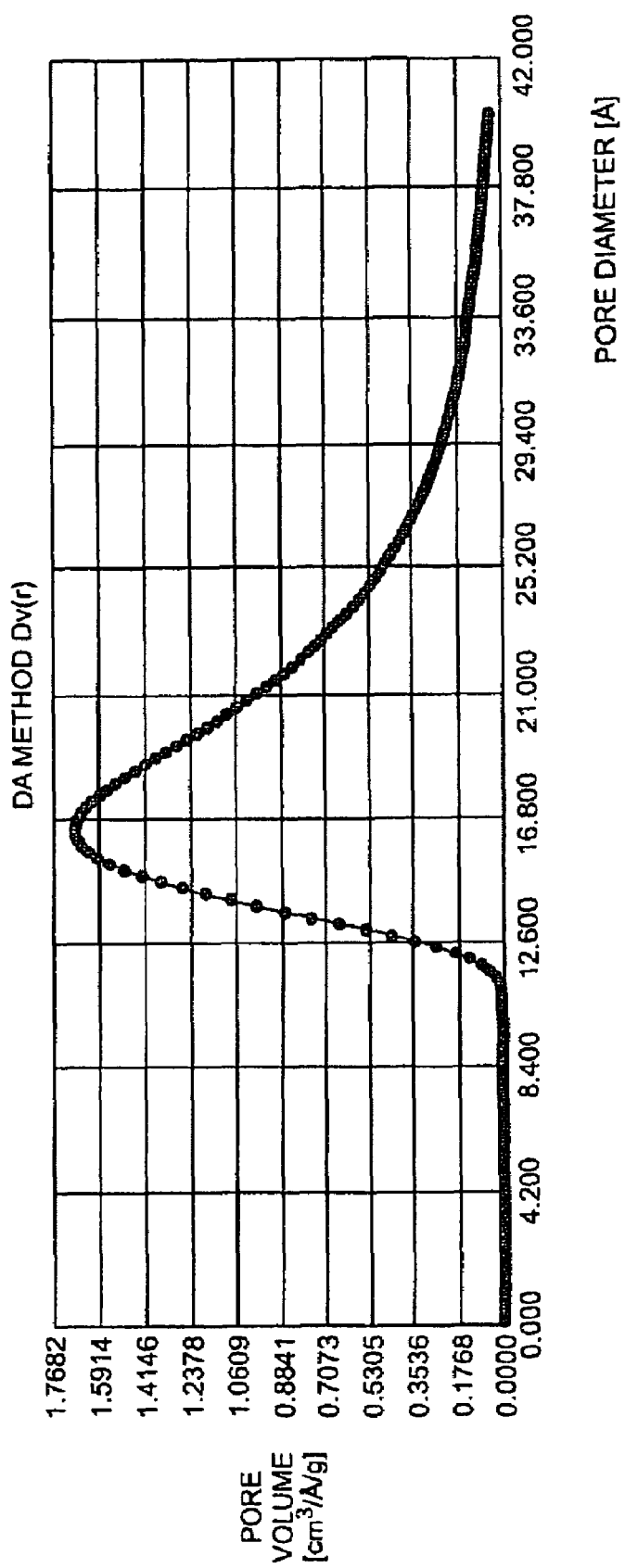
FIG. 1 is a graphical representation showing the pore size distribution obtained for spherical active carbon particles prepared according to Example 1. Pore volume (cm3/Å/g) is shown as a function of pore diameter (Å).

For achieving this technical object, the invention teaches a spherical active carbon preferably having a particle diameter in the range from 0.1 to 5 mm and a pore size distribution (% v/v of the total pore volume in the pore diameter range), measured according to Example 2, as follows: a) 1.2-1.7 nm: 20-50%, b) 1.7-2.1 nm: 20-50%, c) 2.1 -2.5 nm: 10-25%, d) 2.5-2.9 nm: 3-15%, e) 2.9-3.3nm: 1-10%, wherein the sum of a) to e) is at least 88 %, wherein the sum of a) to e) is at least 88%, wherein the difference of the sum of a) to e) to 100% defines a share of pores having a diameter<1.2 nm and/or>3.3 nm, and wherein the fractal dimension of the open porosity, as measured according to Example 3, is at least 2.30.

Statements with regard to pore volumes or volume shares always relate to the open porosity, which also immediately follows from the measuring method described in the Examples. Closed porosity, such as for instance measurable by means of small angle neutron scattering, is, however, excluded from the assumed total porosity.

The invention is based on the finding that an active carbon meeting all requirements is obtained by, on the one hand, a relatively high microporosity is specifically adjusted, and on the other hand, a defined surface roughness of inner surfaces is specifically produced. The latter can be described by the fractal dimension, as explained by the following. Surprisingly, in contrast to the assumptions of the prior art, a larger portion of mesopores and macropores is not required for improving the transport kinetics.

Due to the complexity of a rough, in particular microrough surface, statements about the area of the surface are problematic. The area depends on the resolution used for the area determination. The topologic dimension of an area is always 2 (topologic dimensions are always integer numbers). In contrast thereto, the Flausdorff-Besicovitch dimension or fractal dimension may be>2, because of the Szpilrajn inequality, if the area has a structure, in particular a microstructure. The fractal dimension is in the case of an area, however, always smaller than 3, since the spatial dimensions are quantized, and therefore infinitely small self-similar structures cannot exist. In the practice of gas adsorption, the upper limit is given by the dimensions of adsorbing sample molecules. The closer the fractal dimension comes to 3, the finer and thus the "microrougher" the structure of the surface is. In the case of carbon surfaces, such a microroughness will lead to irregularities capable of improved binding of molecule species to be adsorbed or at least acting attractively since the electronic state density functions occur to a higher degree at the (inner) surface. The improvement of the binding comprises on the one hand an increase in the packing density within an adsorbed monolayer, and on the other hand, an increased binding stability.

By the invention, it was found, among other things, that the adjustment of a fractal dimension as high as possible in conjunction with a high microporosity will lead to improved adsorption capacities. This is not inconsistent, since a small mesoporosity and macroporosity theoretically reduces the fractal dimension. However, the contribution of the mesoporosity and macroporosity to the fractal dimension is rather small overall.

The adjustment on the one hand of the pore structure and on the other hand of the fractal dimension is easily possible for one of ordinary skill in the art, for instance by preparation parameter variation according to the document WO 99/28234. For this purpose, at least one parameter is varied, and the influence on the mentioned values is determined, as explained in the Examples. According to the determined influence, the parameters are definedly controlled or modified (in the case of the method according to WO 99/28234 an extrapolation is necessary) such that the properties according to the invention are obtained. Of course, other preparation methods may also be used, and essentially such methods are used, which in principle are suitable for preparing active carbon high-performance adsorbents.

Preferably, a spherical active carbon according to the invention has a pore size distribution as follows: a) 1.2-1.7 nm: 30-40%, in particular 32-36%, b) 1.7-2.1 nm: 30-40%, in particular 32-36%, c) 2.1-2.5 nm: 15-20%, in particular 15-20%, d) 2.5-2.9 nm: 5-10%, in particular 5-10%, e) 2.9-3.3 nm: 1-5%, in particular 3-5%. The sum of a) to e) may be at least 90%, preferably at least 93% to 95%. The fractal dimension is at least 2.70, preferably at least 2.80, most preferably at least 2.90 to 2.92.

The particle diameter is in principle arbitrary. For applications in gas filters, in particular toxic gas filters in gas masks, gas protection suits, or the like, it is preferred that the particle diameter is 0.5 to 2 mm. Gas protection suits are made from textile materials, where an adsorption agent is built in. This may happen in the most various ways, for instance by weaving-in or preparing a multi-layer textile product, a layer containing or enveloping an adsorption agent. Gas protection suits serve in particular for protection from contact toxins and/or microorganisms. In a particular embodiment of the invention, for instance for toxic gas filters, but also for other applications, the spherical active carbon particles are provided with a gas-permeable, for instance porous envelope of wear-resistant material. Thereby, disturbing carbon abrasion in the handling and use is prevented, without the adsorption capacity being substantially reduced. Such an envelope may for instance be made by that the spherical active carbon is sprayed before or after the activation with for instance a fluid natural or synthetic organic binding agent, which transforms after a subsequent thermal treatment into a wear-resistant, but porous carbon binder.

The BET surface, measured according to Example 4, is preferably in the range from 800 to 1,500, in particular 1,000 to 1,300.

A spherical active carbon according to the invention is in principle obtainable by that polymer balls, in particular ion exchanger balls, the polymer structure of which contains separable functional groups, in particular sulfonyl groups and/or carboxyl groups, are used as an educt, that the functional groups are separated from the polymer structure and the separated product is driven out of the polymer balls, that the porous polymer balls thus obtained are pyrolyzed, and that optionally the pyrolyzed polymer balls are subjected to an activation step. The separation of the functional groups preferably occurs up to a residual content (referred to the weight share of the functional groups, as used) of 5% to 15%. The temperature of this first heat treatment is suitably in the range from 200° C. to 350° C. for 10 mm to 60 mm. The atmosphere is in principle arbitrary. The following pyrolysis step starts at a temperature, which essentially corresponds to the final temperature of the first heat treatment, and preferably ends at 600° C. to 800° C. The heating-up rate is suitably in the range from 5 K/min to 0.5 K/min, and therefrom the duration of the pyrolysis step can immediately be calculated. The activation step is uncritical and occurs in a conventional way.

A spherical active carbon according to the invention can, for instance, be used in means for filtering gases, in particular air filters and gas masks or gas protection suits. Further applications are: gas separation, gas storage, latent heat exchanger, filter devices in air-conditioning systems, in particular in the air entry section for the adsorption of toxic gases unauthorizedly released in the air entry section, carriers for pharmaceutical compositions.

In the following, the invention is described in more detail with reference to Examples representing possible embodiments only.

EXAMPLE 1

Preparation of a Spherical Active Carbon According to the Invention

A strong acid, gel-type cation exchanger from sulfonated styrene-divinylbenzene copolymerisate in the H-form is used, and the matrix is cross-linked with an approx. 8% divinylbenzene share, having a ball shape and a particle size (diameter) of 1 mm. This commercial product (C100×10H, Purolite) is first washed three times with deionized water (30 min, 40° C.). After washing, a centrifugation under vacuum (8,000 g, 10 min, 10 mBar) is performed. Then follows a first heat treatment in a heated worm for decomposing and driving-out the sulfonyl groups, and that up to a residual sulfur content of 10% w/w, referred to the used total sulfur. This first heat treatment takes place under argon protection gas at 285° C. for 20 min. Subsequently thereto follows a pyrolysis step in a separate rotary kiln with indirect heating and under argon protection gas. The pyrolysis step is performed with a heating gradient of approx. 1 K/min, beginning at 285° C. and ending at 680° C. Therefrom results a duration of approx. 400 min. After the pyrolysis step, an activation step is performed, wherein the pyrolyzed balls are held in an activation gas atmosphere (Ar 65% v/v, $CO$ 27% v/v, $H_2O$ 28% v/v) for 240 min at 910° C.

The obtained spherical active carbon particles have a diameter of approx. 0.55 mm. A spherical active carbon with a high share of micropores and relatively very small share of mesopores and macropores as well as with a very high fractal dimension is obtained. The pore distribution and the fractal dimension are determined according to the following Examples.

EXAMPLE 2

Determination of the BET Surface

Spherical active carbon from Example 1 was investigated using the method for determining the BET surface according to Brunauer, Emmett, Teller. The adsorption is essentially based on the interaction of electrically charged particles or dipoles of the adsorbent (the adsorbing substance) and of the adsorptive (the substance, which is adsorbed). By observing the amount of an adsorptive adsorbed at a constant temperature and constant pressure by a solid adsorbent in an equilibrium condition, the adsorption isotherm is obtained. The adsorbed amount, the adsorbate, is related to the mass of the adsorbent. The analyzed course corresponds to the isotherm types II (according to the classification of Brunauer, L. S. Deming, W. S. Deming and Teller) with the adsorbed amount on the ordinate and the equilibrium pressure on the abscissa.

For the evaluation of such isotherms, which in particular occur for higher gas pressures and lower temperatures, too, the generalization of the Langmuir mechanism introduced by Brunauer, Emmett and Teller represents the way chosen in this measuring method. For this purpose, the adsorption of electrically neutral particles is assumed, and it is further assumed that with saturation only one monomolecular layer can be formed. All positions to be occupied by the adsorbent volume, localized and energetically equivalent, are regarded as adsorption centers. The desorption frequency is not influenced by the occupation of the adjacent positions. The BET mechanism maintains the assumption of certain adsorption centers, however includes the generation of polylayers. The mathematical basics of the evaluation are as follows:

$$p/[\Gamma(p0-p)]=1/(\Gamma_\alpha *C)+(C-1)*p/(\Gamma_\alpha *C*p0)$$

Herein, $p_0$ is the saturation pressure of the adsorptive at the temperature of the isotherm, $\Gamma_\alpha$ is the adsorption density corresponding to a complete monolayer, and C is exp $[(Q_A-Q_K)/(R*T)]$, wherein $Q_A$ is the adsorption enthalpy of the molecules of the first layer and $Q_K$ is the condensation enthalpy. If $p/[\Gamma(p_0-p)]$ is plotted as a function of $p_0/p$, a straight line is obtained, from the slope and intercept of which $\Gamma_\alpha$ and C can be calculated. If then the need of inner surface for an adsorbed molecule is known, then by means of $\Gamma_\alpha$ the inner surface can be calculated.

The corresponding investigation of an active carbon of Example 1 resulted in a value of 1,050 m²/g.

EXAMPLE 3

Determination of the Pore Size Distribution

For the determination of the pore size distribution, the desorption isotherm is needed for thermodynamic reasons. For nitrogen as the adsorbate at its normal boiling point of 77.4 K, the Kelvin equation is used as follows, $$r_K = 4.15/\log p_0/p,$$

including the physical parameters from the determination of the largest pore radii r from the following equation:

$$r = -(2*8.85*34.6)/(8.314*10^7 *77.4*2.303*\log 0.99)$$
$$= 950*10^{-9} \text{ cm},$$

wherein 8.85 erg cm$^{-2}$ is the surface tension of N$_2$ at 77.4 K, 34.6 cm³ the molar volume of N$_2$ at 77.4 K, 950*10$^{-9}$ cm the pore limit size and 0.99 the ratio $p/p_0$.

The term $r_k$ designates the radius of the pores, in which the condensation occurs with the required relative pressure. This radius (Kelvin radius or critical radius) is not the actual pore radius. After some encountered adsorption points, the pore wall is occupied already before the next condensation, and $r_k$ designates the radius after evaporation of the nitrogen of the "cored center". If the thickness of the adsorbed film at condensation or evaporation is t, then the actual pore radius rp is:

$$rp = r_k + t.$$

In order to calculate $r_p$, a determination of the film thickness t is necessary. Under the assumption that the adsorbed film thickness for every value of the relative pressure in a pore is the same as on a plane surface, the following equation applies.

$$t = (W_a/W_m)\tau,$$

wherein $W_a$ and $W_m$ respectively correspond to the adsorption quantity at a defined relative pressure and the amount of the monolayer belonging to this BET value. Essentially, this equation means that the thickness of the adsorbed film is equal to the number of the layers times the thickness of an individual layer, irrespective of whether the film is in a pore or on a plane surface. The value can be calculated by considering the volume V and the area S of a surface, which is wetted by one mole of liquid nitrogen in a monomolecular layer.

$$S=16.2*6.02*10^{23}=97.5*10^{23} \text{ Å}^2 \text{ (Å=Ångström)}$$

$$V=34.6*10^{23} \text{ Å}^3.$$

Therefrom follows:

$$\tau = V/S = 3.54 \text{ Å}.$$

The value 3.54 Å does not exactly correspond to the diameter of a nitrogen molecule. This results, by observation of the liquid structure, from the fact that liquids tend to be arranged in hexagonally closed compounds, and every molecule is positioned in depressions between three molecules in the upper and lower layers. With this knowledge, the calculation of t can be made as follows:

$$t = (W_a/W_m)*3.54 \text{ Å}.$$

For non-porous surfaces was demonstrated that if $W_a/W_m$ is plotted as a function of $p/p_0$, all data approximately correspond to the general type II isotherm at a relative pressure of 0.3. This in turn indicates that if for instance $W_a/W_m=3$, the adsorbed layer thickness is t=10.62 Å, irrespective of which adsorbent is used. The general curve is precisely described by the Halsey equation:

$$t = 3.54*(5/[2.303*\log p_0/p])^{1/3}.$$

In order to calculate the pore size distribution, the data of Table 1 are used. The adsorbed volumes stated here originate from a hypothetical isotherm. The employed method is the numerical integration method according to Pierce, von Orr and Dalla Valle, modified with regard to the calculation of the thickness of the adsorbed film. This method as well as the numerical integration method according to Barrett, Joyner and Halenda was used by Wheeler for his theory that the condensation in the pores occurs exactly then, when the critical relative pressure belonging to the corresponding Kelvin radius $r_k$ is obtained. This model further assumes that an adsorbed multimolecular layer of the thickness t would exist in the same thickness on a pore inner wall as well as on a non-porous surface. In order to proceed according to this method, Table 1 can be used. The Table 1 contains usual data of the adsorption and desorption isotherm. Usually, the desorption isotherm is used for the determination of the desorption isotherm, except in those cases, where the adsorption is the thermodynamically more stable condition. In both cases, the data are calculated decreasingly from high to low pressures. Columns 1 and 2 of Table 1 contain data, which directly originate from the isotherm, and the adsorbed volume is generally related to one gram adsorbent. All other data can be calculated. Therefrom the following equation provides the possibility of precisely determining the pore volumes at a variable relative pressure.

$$V_{pn} = [r_{pn}/r_{kn} + \Delta t_n/2)]^{2*}\left(\Delta V_n - \Delta t_n * \sum_{j=1}^{n-1} Ac_j\right)$$

$$A_p = 2V_p/r_p$$

$$c = (r_p - t)/r_p$$

The pore size distribution obtained with an active carbon according to Example 1 is shown in FIG. 1. After integration, the following values were obtained: 1.2-1.7: approx. 33%, 1.7-2.1: approx. 34%, 2.1-2.5: approx. 16%, 2.5-2.9: approx. 6%, 2.9-3.3: approx. 4%. The pores<4 nm were approx. 94% of the total (open) pore volume.

EXAMPLE 4

Determination of Fractal Dimension

The fractal dimension serves for characterizing surfaces and is based on the fractal geometry for describing the topography of real surfaces. The fractal dimension D is an ideal parameter for describing the roughness of real surfaces. This term was created by the mathematicians Hausdorff and Besicovitch, who have shown that D needs not to be integer for non-standard figures (surfaces), and that for every mathematical set a real number D exists. Hausdorff has detected for the simplest category of these real numbers (positive and finite) that it contains the Cantor set as well as the Koch curve. With regard to the determination of the fractal dimension D for inner surfaces of adsorbents, two methods have proven suitable, since they only need for their calculation a gas sorption isotherm. This is on the one hand the Neimark-Kiselev (NK) method and on the other hand, as described below, the Frenkel-Halsey-Hill (FHH) method.

The FHH method is employed as follows. Because of the finding that in regions, where the adsorption occurs in multilayers, the influence of forces of the inner surfaces becomes lower, several authors developed independently from each other the following isotherm equation:

$$\log p_0/p = B/V^s,$$

wherein B is a parameter, which reflects interactions between adsorbent-adsorbate and between adsorbate-adsorbate. V is the amount of adsorbate, and s defines a constant property of the used adsorbent. According to today's experiences, s correlates with the fractal dimension D of the adsorbent by the relation D=3(1+s), and in the practice $$D = 3 + s$$

is used, under consideration of surface tension effects.

In both cases for fractal surfaces, V plotted against $p_0/p$ will result, within the limits of the multilayer adsorption of the isotherm, in a straight line having a negative slope corresponding to the value of s.

The analysis is made as follows. For recording the adsorption and desorption isotherms of the adsorbents to be tested, a high-speed gas sorption analyzer supplied by Quantachrome is used. The sample amount is restricted, for the adsorption capacities to be expected, to 100 mg adsorbent (not milled). The recording of the isotherms occurs at a temperature of 77.4 K with nitrogen (high-purity) as an adsorptive. For evaluating, the above methods, in particular the FHH method, are used.

Spherical active carbon from Example 1 was therefore investigated for the fractal dimension. As a value, D=2.926 was obtained.

What is claimed is:

1. A spherical active carbon having a pore size distribution (% v/v of a total pore volume in the pore diameter range), measured according to Example 2, as follows:
    a) 1.2-1.7 nm: 20-50%,
    b) 1.7-2.1 nm: 20-50%,
    c) 2.1-2.5 nm: 10-25%,
    d) 2.5-2.9 nm: 3-15%,
    e) 2.9-3.3 nm: 1-10%,
    wherein the sum of a) to e) is at least 88%,
    wherein the difference of the sum of a) to e) to 100% defines a share of pores having a diameter <1.2 nm and/or >3.3 nm, and
    wherein the fractal dimension of the open porosity, as measured according to Example 3, is at least 2.30.

2. The spherical active carbon according to claim 1 having a pore size distribution as follows:
    a) 1.2-1.7 nm: 30-40%,
    b) 1.7-2.1 nm: 30-40%,
    c) 2.1-2.5 nm: 15-20%,
    d) 2.5-2.9 nm: 5-10%,
    e) 2.9-3.3 nm: 1-5%.

3. The spherical active carbon according to claim 1 having a pore size distribution as follows:
    a) 1.2-1.7 nm: 32-36%,
    b) 1.7-2.1 nm: 32-36%,
    c) 2.1-2.5 nm: 15-20%,
    d) 2.5-2.9 nm: 5-10%,
    e) 2.9-3.3 nm: 3-5%.

4. The spherical active carbon according to claim 1, wherein the sum of a) to e) is at least 90%.

5. A spherical active carbon according to claim 1, wherein the fractal dimension is at least 2.70.

6. The spherical active carbon according to claim 1, wherein the particle diameter is 0.1 to 3 mm.

7. The spherical active carbon according to claim 1, wherein the BET surface, measured according to Example 4, is in the range from 800 to 1,500.

8. The spherical active carbon according to claim 1, obtainable by that polymer balls, comprising ion exchanger balls, the polymer structure of which contains separable functional groups, comprising sulfonyl groups or carboxyl groups, are used as an educt; the functional groups are separated from the polymer structure and the separated product is driven out of the polymer balls; the porous polymer balls thus obtained are pyrolyzed; and the pyrolyzed polymer balls are subjected to an activation step.

9. The spherical active carbon according to claim 1, wherein the sum of a) to e) is at least 93%.

10. The spherical active carbon according to claim 1, wherein the fractal dimension is at least 2.80.

11. The spherical active carbon according to claim 1, wherein the fractal dimension is at least 2.90 to 2.92.

12. The spherical active carbon according to claim 1, wherein the particle diameter is 0.5 to 1 mm.

13. The spherical active carbon according to claim 1, wherein the BET surface is in the range from 1,000 to 1,300.

* * * * *